United States Patent
Gerhard et al.

(10) Patent No.: US 7,379,074 B2
(45) Date of Patent: May 27, 2008

(54) SEMANTICALLY APPLYING FORMATTING TO A PRESENTATION MODEL

(75) Inventors: Lutz Gerhard, Seattle, WA (US); Tom Underhill, Seattle, WA (US); Gary Pritting, Issaquah, WA (US); John Schilling, Seattle, WA (US); Eric S. Rockey, Seattle, WA (US); Keri Vandeberghe, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 287 days.

(21) Appl. No.: 11/013,630

(22) Filed: Dec. 15, 2004

(65) Prior Publication Data

US 2006/0066627 A1    Mar. 30, 2006

Related U.S. Application Data

(63) Continuation-in-part of application No. 10/957,103, filed on Sep. 30, 2004.

(51) Int. Cl.
| | |
|---|---|
| G09G 5/00 | (2006.01) |
| G09G 5/02 | (2006.01) |
| G06K 9/00 | (2006.01) |
| G03F 3/08 | (2006.01) |
| G06F 15/00 | (2006.01) |
| G06K 9/20 | (2006.01) |
| G06F 15/13 | (2006.01) |
| G06F 17/00 | (2006.01) |

(52) U.S. Cl. ............... 345/600; 345/581; 345/589; 345/593; 345/586; 382/164; 382/166; 382/282; 358/518; 715/523; 715/528

(58) Field of Classification Search ............... 345/426, 345/428, 581, 589, 593, 597, 600, 606, 619, 345/636, 643, 650; 382/162–167, 173, 177, 382/282; 715/517, 523, 526, 528, 780; 358/518–519, 358/537–538, 525
See application file for complete search history.

(56) References Cited

U.S. PATENT DOCUMENTS 5,214,755 A    5/1993    Mason
(Continued)

FOREIGN PATENT DOCUMENTS

EP    1 111 543 A2    6/2001
(Continued)

OTHER PUBLICATIONS

European Search Report for EP 05 10 5366.
(Continued)

*Primary Examiner*—Wesner Sajous
(74) *Attorney, Agent, or Firm*—Merchant & Gould P.C.

(57) ABSTRACT

The present invention includes a graphics software program that automatically generates a color scheme for graphics. In embodiments of the present invention, the graphics software program receives a selection of a color transformation and a semantic model describing a graphic. The graphics software program interpolates color values for different portions of the graphic according to the color transformation and semantic model. In other embodiments, a data structure is provided for a color transformation definition created to assign the color values to portions of the graphic.

20 Claims, 10 Drawing Sheets
(3 of 10 Drawing Sheet(s) Filed in Color)

Fig. 1

U.S. PATENT DOCUMENTS

| | | | |
|---|---|---|---|
| 5,649,216 | A | 7/1997 | Sieber |
| 5,818,447 | A | 10/1998 | Wolf et al. |
| 5,903,902 | A | 5/1999 | Orr et al. |
| 5,909,220 | A * | 6/1999 | Sandow ..................... 345/589 |
| 6,057,842 | A * | 5/2000 | Knowlton et al. .......... 715/788 |
| 6,057,858 | A * | 5/2000 | Desrosiers .................. 345/467 |
| 6,081,816 | A | 6/2000 | Agrawal |
| 6,173,286 | B1 | 1/2001 | Guttman et al. |
| 6,189,132 | B1 | 2/2001 | Heng et al. |
| 6,204,859 | B1 * | 3/2001 | Jouppi et al. ............... 345/592 |
| 6,405,225 | B1 | 6/2002 | Apfel et al. |
| 6,667,750 | B1 | 12/2003 | Halstead et al. |
| 6,826,727 | B1 | 11/2004 | Mohr et al. |
| 7,055,095 | B1 | 5/2006 | Anwar |
| 7,107,525 | B2 | 9/2006 | Purvis |
| 2001/0051962 | A1 | 12/2001 | Plotkin |
| 2003/0079177 | A1 | 4/2003 | Brintzenhofe et al. |
| 2004/0111672 | A1 | 6/2004 | Bowman et al. ............. 715/513 |
| 2004/0133854 | A1 | 7/2004 | Black .......................... 715/517 |
| 2004/0205602 | A1 | 10/2004 | Croeni |
| 2005/0157926 | A1 * | 7/2005 | Moravec et al. ............. 382/173 |
| 2005/0273730 | A1 | 12/2005 | Card et al. .................. 345/440 |
| 2005/0289466 | A1 | 12/2005 | Chen |
| 2006/0064642 | A1 | 3/2006 | Iyer |
| 2006/0066631 | A1 | 3/2006 | Schorr et al. ............... 345/619 |
| 2006/0294460 | A1 | 12/2006 | Chao et al. |
| 2007/0055939 | A1 | 3/2007 | Furlong et al. |

FOREIGN PATENT DOCUMENTS

| | | |
|---|---|---|
| EP | 1 111 543 A3 | 6/2001 |
| WO | WO 01/39019 A2 | 5/2001 |
| WO | WO 2001/039019 A2 | 5/2001 |
| WO | WO 03/052582 A1 | 6/2003 |
| WO | WO 2004/046972 A1 | 6/2004 |

OTHER PUBLICATIONS

Roderick Singleton, "OpenOffice.org User Guide for Version 1.1.x", May 7, 2004, ONLINE, XP002348571; retrieved from the Internet: URL:www.openoffice.org>, retrieved Sep. 30, 2005; pp. 253-284.

"Proquis Compliance Management & Document Control Solutions"; http://wwws.proquis.com/allclear-text2chart.asp, 1 page.

"Exploring the Layouts", 1999 Software Publishing Corporation, 2 pgs.

"Create Diagrams in Word 2002, Excel 2002, and Power Point 2002"; http://office.microsoft.com/en-us/assistance/HA010346141033.aspx, 2 pgs.

Extended European Search Report for EP 05 10 8636.

Anonymous: Extract of Online-Help for OpenOffice Impress (Stylist), Ver. 1.1.5, German Version, online! Apr. 2004.

EP Search Report for EP 05 10 5366.

Extended EP Search Report for EP 05 10 8636.

Roderick Singleton, "OpenOffice.org User Guide for Version 1.1.x", May 7, 2004, ONLIN, XP002348571; retrieved from the Internet: URL:www.openoffice.org>, retrieved Sep. 30, 2005, pp. 253-284.

ANONYMOUS: "Extract of Online-Help for OpenOffice Impress (Stylist), Ver. 1.1.5, German Version," online! Apr. 2004.

"Proquis Compliance Management & Document Control Solutions,"; http://www.proquis.com/allclear-text2chart.asp, 1 page.

"Exploring the Layouts"; 1999 Software Publishing Corporation, 2 pgs.

Create Diagrams in Word 2002, Excell 2002, and PowerPoint 2002; http://office.microsoft.com/en-us/assistance/HA0103461410333.aspx, 2 pgs.

U.S. Appl. No. 10/957,103, filed Sep. 30, 2004, entitled "Editing The Text of An Arbitrary Graphic Via A Hierarchical List." Inventors: Brent Gilbert; Cynthia C. Shelly; Gary A. Pritting; Kim Tapia St. Armant; Matthew J. Kotler; and Richard J. Wolf.

U.S. Appl. No. 11/081,324, filed Mar. 15, 2005, entitled "Method and Computer-Readable Medium for Fitting Text to Shapes within a Graphic." Inventors: Ilan Berker; Jason C. Costa; Keywon Chung; Matthew J. Kotler; Janet L. Schorr, Scott A. Sherman; and Karen K. Wong.

U.S. Appl. No. 11/081,323, filed Mar. 15, 2005, entitled "Method and Computer-Readable Medium for Generating Graphics Having a Finite Number of Dynamically Sized and Positioned Shapes." Inventors: Ilan Berker; Matthew Kotler; Janet L. Schorr; Scott A. Sherman; Thomas C. Underhill; and Stephen T. Wells.

U.S. Appl. No. 10/955,271, filed Sep. 30, 2004, entitled "Method, System, and Computer-Readable Medium for Creating and Laying out a Graphic within an Application Program."

EP Search Report dated Feb. 13, 2006.

US Office Action dated Jan. 9, 2007 cited in U.S. Appl. No. 10/955,271.

US Office Action (Final), dated Oct. 23, 2007 cited in U.S. Appl. No. 10/957,103.

EP Patent Application No. 05-108-658.5 Search Report dated Feb. 13, 2006.

EP Search Report cited in EP 05 10 5366.8-2218 dated Jan. 2, 2006.

EP Search Report cited in EP 05 10 863 1-2218 dated Jan. 2, 2006.

US Final Office Action dated Jul. 6, 2007, cited in U.S. Appl. No. 11/081,323.

US Final Office Action dated Oct. 3, 2006 cited in U.S. Appl. No. 10/955,271.

US Office Action dated Apr. 17, 2007 cited in U.S. Appl. No. 10/955,271.

US Office Action dated Jan. 22, 2007 cited in U.S. Appl. No. 11/081,323.

US Office Action dated Jun. 29, 2007 cited U.S. Appl. No. 11/081,324.

US Office Action (Advisory) dated Sep. 18, 2007 cited in U.S. Appl. No. 11/081,323.

US Office Action dated Apr. 20, 2006 cited in U.S. Appl. No. 10/955,271.

US Office Action dated May 16, 2006 cited in U.S. Appl. No. 10/957,103.

\* cited by examiner

800 ⟶

802 ⟶ ForEach axis="child" element=normal>
<LayoutNode>
804 ⟶ <StyleLabel ref="normal1"/>
<ForEach axis="child" element=normal>
<LayoutNode>
806 ⟶ <StyleLabel ref="normal2"/>
<ForEach name="repeat" axis="child" element=normal>
808 ⟶ <LayoutNode>
<StyleLabel ref="normal3"/>
<ForEach ref="repeat"/>
</LayoutNode>
</ForEach>
</LayoutNode>
</ForEach>
</LayoutNode>
</ForEach>

812 ⟶ <ColorTransform id="microsoft.com/igx/2005/cf1">
814 ⟶ <Name>Glacier</Name>
<Category>foo</Category>
816 ⟶ <Priority>1000</Priority>
818 ⟶ <DiagramCategory value="Hierarchy"/>
<StyleLabel name="normal1"> ⟵ 820
<FillColor > ⟵ 822
<Color index="3" lum="+20%"/>
</FillColor> ⟵ 824
<TextColor/>
<LineColor/>
</StyleLabel>
<StyleLabel name="normal2">
<FillColor index="3" lum="+40%">
</FillColor>
<TextColor/>
<LineColor/>
</StyleLabel> ⟵ 826
<StyleLabel name="normal3">
<FillColor index="3" lum="+60%"> ⟵ 828
</FillColor>
<TextColor/> ⟵ 830
<LineColor/> ⟵ 832
</StyleLabel>

Fig. 8B

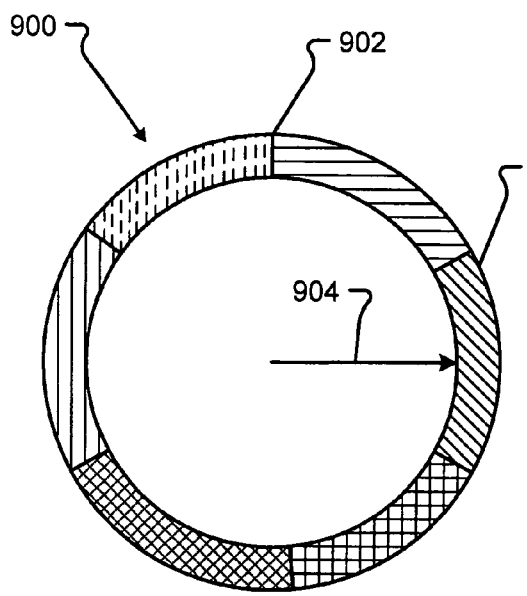
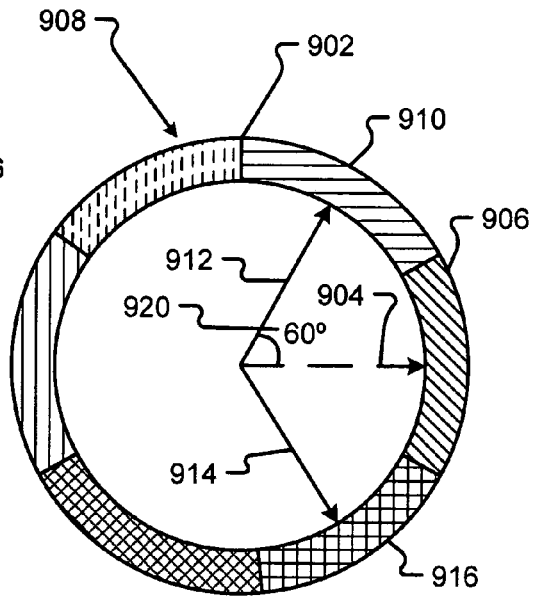
Fig. 9A
Fig. 9B
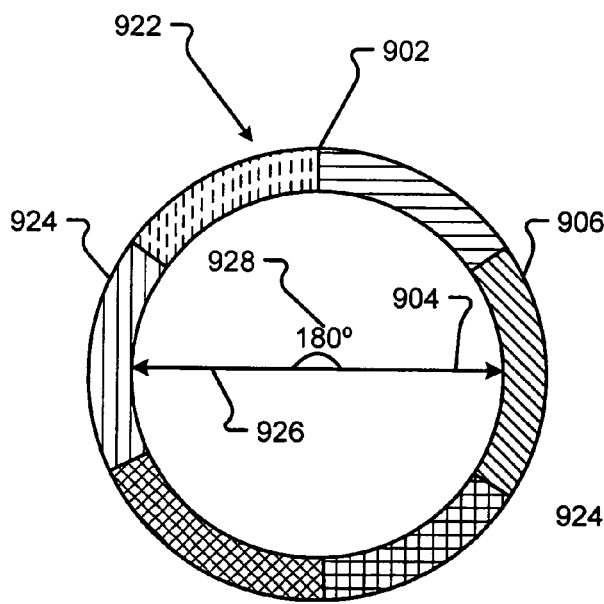
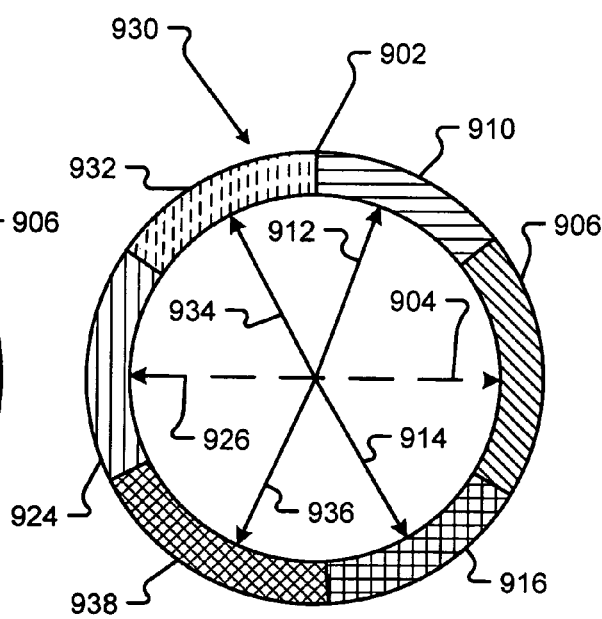
Fig. 9C
Fig. 9D

SEMANTICALLY APPLYING FORMATTING TO A PRESENTATION MODEL

CROSS-REFERENCE TO RELATED APPLICATION

This application is a continuation in part application of an application entitled "EDITING THE TEXT OF AN ARBITRARY GRAPHIC VIA A HIERARCHICAL LIST," application Ser. No. 10/957,103, filed on Sep. 30, 2004, and assigned to Microsoft Corporation, which application is incorporated herein by reference.

COPYRIGHT NOTICE

As per 37 CFR 1.71(e), a portion of the disclosure of this patent document contains material which is subject to copyright protections. The copyright owner has no objection to the facsimile reproduction by anyone of the patent document of the patent disclosure, as it appears in the Patent and Trademark Office patent file or records, but other wise reserves all copyrights whatsoever.

TECHNICAL FIELD

The present invention relates generally to the creation and editing of graphical presentations. More particularly, the present invention relates to the formatting of visual presentations in computer graphics applications or programs.

BACKGROUND OF THE INVENTION

Visual aids help people understand information. Conveying information to or among groups of people almost necessarily requires creating visual presentations. These visual presentations generally provide graphical content to the user's choice of media, e.g. text or audio. Computer programs, such as the Microsoft® PowerPoint® presentation application, have helped automate the task of creating such graphical content. Such graphics programs generally allow users to convey information more efficiently and effectively by putting that information in easily understandable formats and contexts.

Graphical content contains information that can have both textual and graphical characteristics. Textual characteristics generally refer to the written matter within the graphical content. Graphical characteristics generally refer to the pictorial or other visual features or formatting of the graphical content. Depending on the information and the audience, the user generally determines a visual diagram that will best teach or convey the underlying information. Then, the user tries to create the diagram that the user has decided to use.

Adding formatting, such as color, to the graphical content further enhances the visual appeal of the presentation. However, users generally have a great amount of trouble coloring portions of the graphic. More specifically, users generally can color only single portions of the graphic at one time. Assigning complementary colors to other portions of the graphic requires the user to adjust manually, in some manner, the color settings for each portion of the graphic. If the user desires a more integrated and professional look for their colored graphics, the user generally has to continually adjust the colors of the different portions of the graphic until the colors match or complement. It is with respect to these and other considerations that the present invention has been made.

SUMMARY OF THE INVENTION

The present invention relates to a novel graphics software application or program. The graphics application comprises embodiments directed toward the automatic application of formatting, such as color schemes or color transformations to graphics. In one embodiment, a method for applying a color transformation to a graphic comprises receiving a semantic model for the graphic. The semantic model is a data structure describing the layout and organization of the graphic. The method automatically determines one or more portions of the semantic model and automatically assigns formatting values or color values for the one or more portions of the graphic.

In another embodiment of the present invention, a user interface receives a semantic model for the graphic. The semantic model, in one embodiment, is created automatically from some user input. The user interface receives a format transformation or a color transformation selection for the graphic. The color transformation selection directs the graphics program to retrieve a color transformation model to apply to one or more portions of the semantic model. The user interface displays the automatically colored graphic with the color values automatically assigned for the one or more portions of the graphic.

The present invention also comprises embodiments of a data structure for a format transformation definition. The data structure comprises one or more data fields. A first data field contains data specifying one or more portions of a semantic model that receives a color transformation. A second data field contains data applying the color transformation application method or model. A third field functions to assign a color value to the one or more portions of the semantic model in the first data field according to the color transformation application method or model in the second data field.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, to the following detailed description of exemplary embodiments of the invention, and to the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 8A is an exemplary semantic model representing the layout and structure of graphical content according to the present invention.

FIG. 8B is an exemplary embodiment of a color transformation definition, related to the semantic model of FIG. 8A, having definitions for automatically assigned fill colors according to the present invention.

FIG. 9A, FIG. 9B, FIG. 9C, and FIG. 9D are exemplary embodiments of color transformation schemes used by the color transformation model to extrapolate colors for portions of the graphic according to the present invention.

DETAILED DESCRIPTION OF THE INVENTION

The present invention will now be described more fully hereinafter with reference to the accompanying drawings, in which embodiments of the invention are shown. The invention may however, be embodied in many different forms and should not be construed as limited to the embodiments set forth herein. Rather, these embodiments are provided so that the disclosure will be thorough and complete and will fully convey the scope of the invention to those skilled in the art. The present invention provides methods and systems for automatically applying formatting to a graphic. The formatting may be any type of visual characteristic change, such as color, pattern, font type, etc. However, the present invention will be explained with embodiments applied to color, but the present invention is not limited to the embodiments described herein, as one skilled in the art will recognize. A graphic is any visual representation of information. In exemplary embodiments of the present invention, the graphic is a diagram, such as a flow chart, an organizational chart, a pie chart, etc. While the present invention will be described with reference to formatting diagrams, the present invention is not limited to the embodiments described herein.

Figure 1:
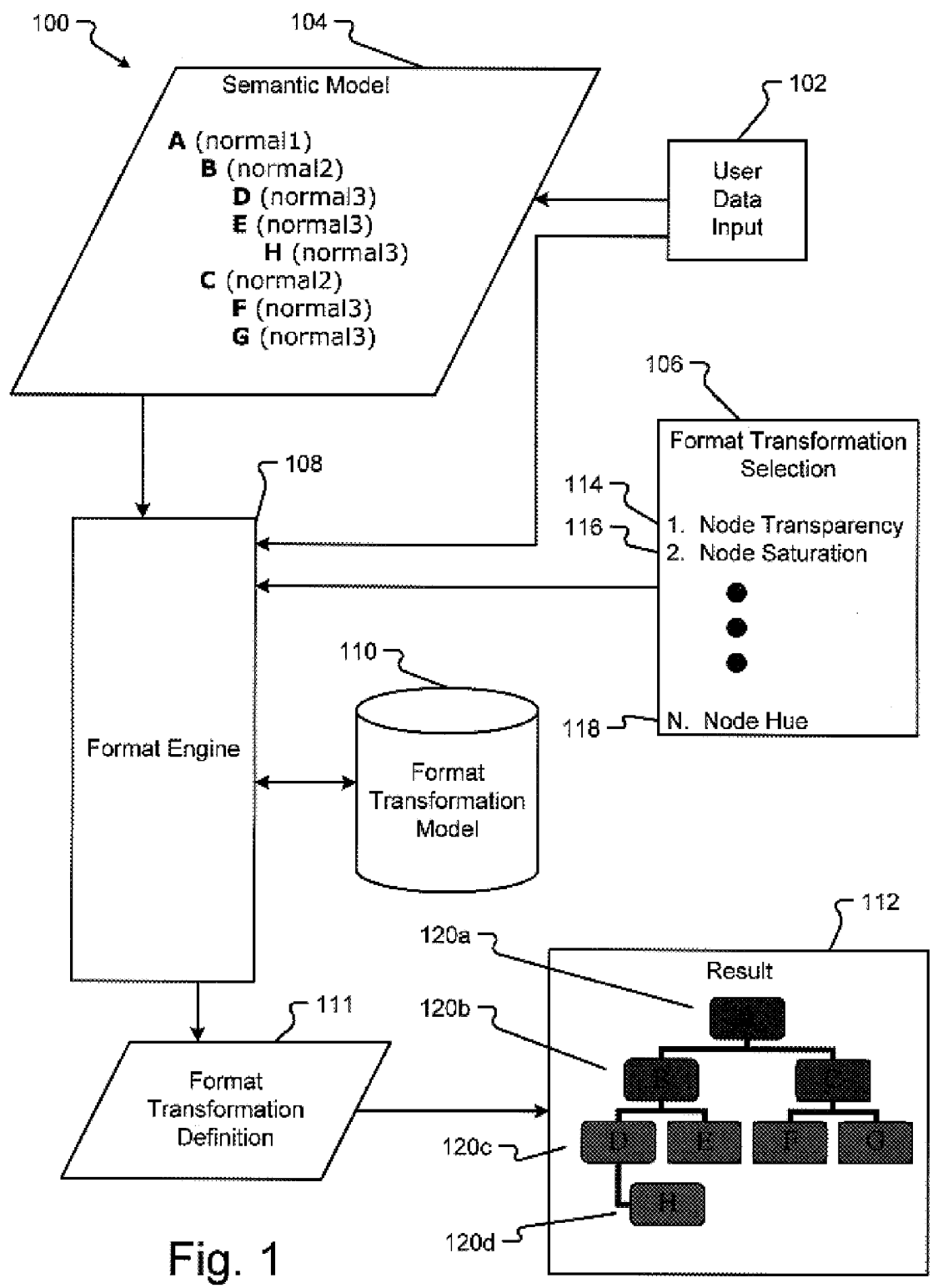
FIG. 1 is an exemplary embodiment of a graphics formatting system for automatically applying format transformations to a graphic according to the present invention.

An embodiment of the present invention for a system 100 for automatically assigning color to a graphic is shown in FIG. 1. The user provides data input 102 to create a graphic. A semantic model 104 is created from the data input 102. A semantic model 104 is a data embodiment that describes the layout, organization, and/or the structure of a graphic. As shown in the present example, the data input 102 provides for a graphic of four levels 120a, 120b, 120c, and 120d, wherein item A is a top level 120a, items B and C are at the same level 120b under item A, items D, E, F, and G are at the same level 120c under items B and C, and item H is at a level 120d below item D. The relationships between the items in the semantic model 104 can be used by the present invention to create color transformations for a displayed graphic. For a more detailed description of semantic models and graphics generated with semantic models, please refer to related application Ser. No. 10/957,103, entitled "EDITING THE TEXT OF AN ARBITRARY GRAPHIC VIA A HIERARCHICAL LIST," and Ser. No. 10/955,271, entitled "METHOD, SYSTEM, AND COMPUTER-READABLE MEDIUM FOR CREATING AND LAYING OUT A GRAPHIC WITHIN AN APPLICATION PROGRAM," both applications were filed on Sep. 30, 2004 and both are assigned to Microsoft Corporation, which both applications are incorporated herein in their entirety.

The semantic model 104 is input into the format engine 108. The user also selects a format transformation 106. Upon selecting the format transformation 106, the format engine 108 retrieves a format transformation model 110 from a data store. Applying the format transformation model 110 to the semantic model 104, the format engine 108 determines a format value for portions of the semantic model 104. The determined formats are assigned to the portions of the graphic, and the format engine 108 outputs a format transformation definition 111. The format transformation definition is then used to render the graphic result 112. The system and method for automatically formatting a graphic is described in more detail below.

Figure 2:
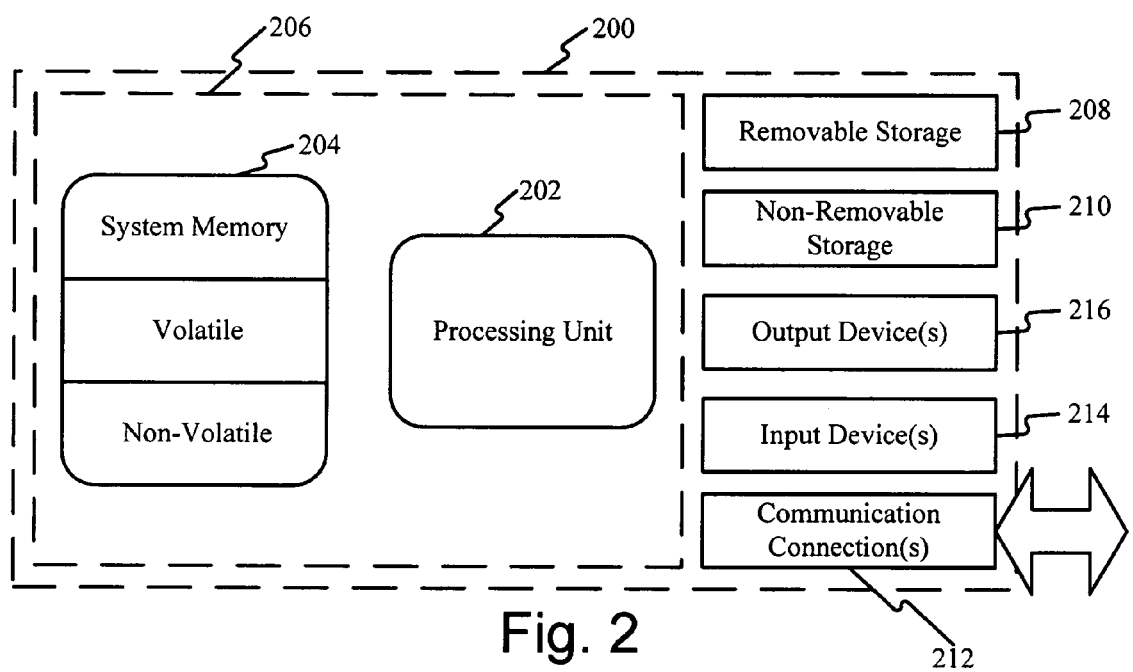
FIG. 2 is a functional diagram illustrating a computing environment and a basic computing device that can operate the graphics formatting system according to the present invention.

An example of a suitable operating environment in which the invention may be implemented is illustrated in FIG. 2. The operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

With reference to FIG. 2, an exemplary system for implementing the invention includes a computing device, such as computing device 200. In its most basic configuration, computing device 200 typically includes at least one processing unit 202 and memory 204. Depending on the exact configuration and type of computing device, memory 204 may be volatile (such as RAM), non-volatile (such as ROM, flash memory, etc.), or some combination of the two. The most basic configuration of the computing device 200 is illustrated in FIG. 2 by dashed line 206. Additionally, device 200 may also have additional features or functionality. For example, device 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information, such as computer readable instructions, data structures, program modules, or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 200. Any such computer storage media may be part of device 200.

Device 200 may also contain communications connection(s) 212 that allow the device to communicate with other devices. Communications connection(s) 212 is an example of communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media.

Device 200 may also have input device(s) 214 such as keyboard, mouse, pen, voice input device, touch input device, etc. Output device(s) 216 such as a display, speakers, printer, etc. may also be included. The devices 214 may help form the user interface 102 discussed above while devices 216 may display results 112 discussed above. All these devices are well know in the art and need not be discussed at length here.

Computing device 200 typically includes at least some form of computer readable media. Computer readable media can be any available media that can be accessed by processing unit 202. By way of example, and not limitation, computer readable media may comprise computer storage media and communication media. Combinations of the any of the above should also be included within the scope of computer readable media.

The computer device 200 may operate in a networked environment using logical connections to one or more remote computers (not shown). The remote computer may be a personal computer, a server computer system, a router, a network PC, a peer device, or other common network node, and typically includes many or all of the elements described above relative to the computer device 200. The logical connections between the computer device 200 and the remote computer may include a local area network (LAN) or a wide area network (WAN), but may also include other networks. Such networking environments are commonplace in offices, enterprise-wide computer networks, intranets, and the Internet.

When used in a LAN networking environment, the computer device 200 is connected to the LAN through a network interface or adapter. When used in a WAN networking environment, the computer device 200 typically includes a modem or other means for establishing communications over the WAN, such as the Internet. The modem, which may be internal or external, may be connected to the computer processor 202 via the communication connections 212, or other appropriate mechanism. In a networked environment, program modules or portions thereof may be stored in the remote memory storage device. By way of example, and not limitation, a remote application programs may reside on memory device connected to the remote computer system. It will be appreciated that the network connections explained are exemplary and other means of establishing a communications link between the computers may be used.

Figure 3:
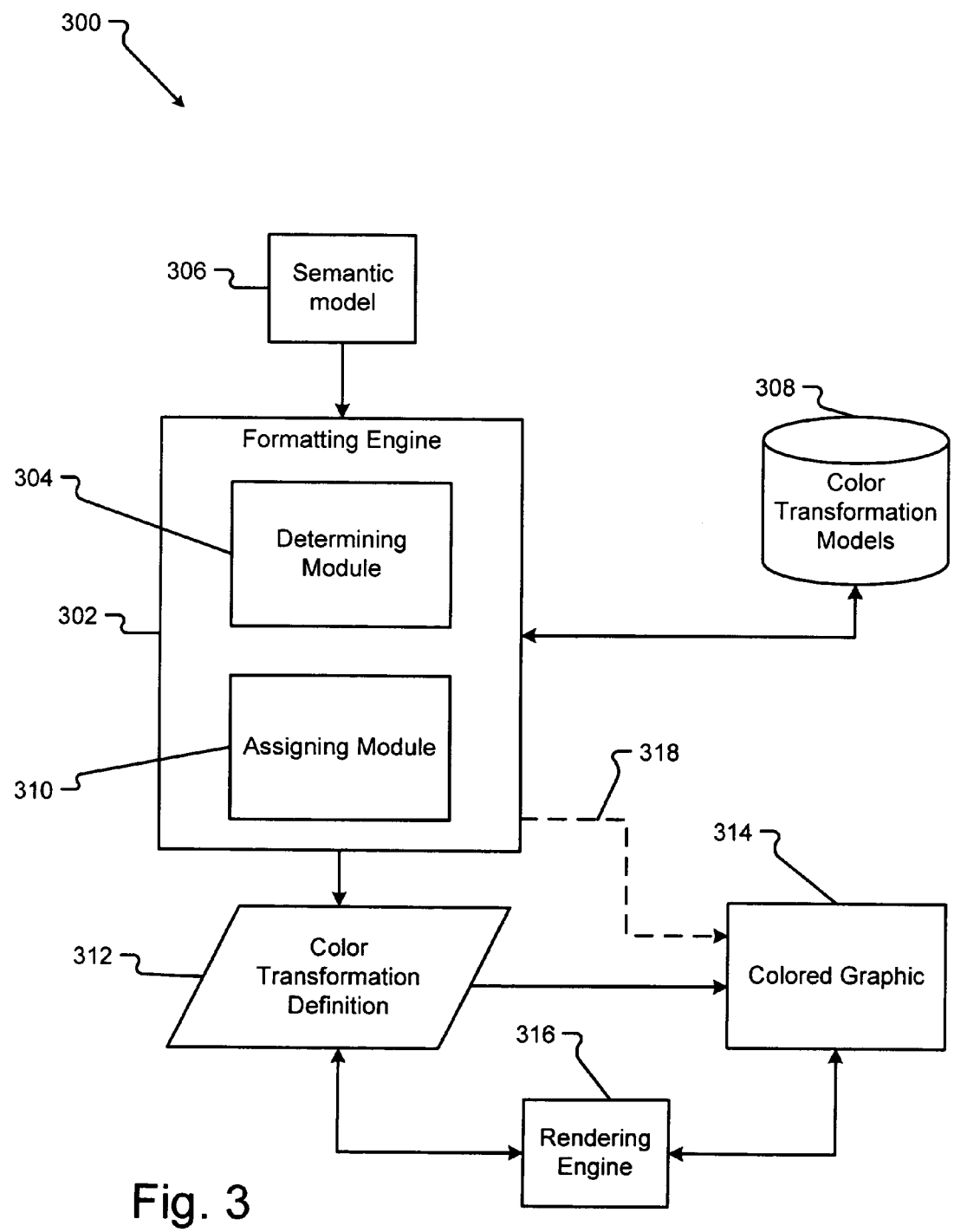
FIG. 3 is a functional diagram to an embodiment of the present invention illustrating the components of a graphics application.

An exemplary embodiment of a system 300 for automatically applying formats to a graphic is shown in FIG. 3. In this exemplary embodiment, the format applied is color. The system 300 uses a format engine 302 to automatically apply formatting, such as color, to data objects and/or graphics objects. In an embodiment, the data entered by the user, such as data input 102 (FIG. 1), creates a semantic model 306 that is stored in system memory. The semantic model 306 contains identifications for every portion of the graphic. For example, determining module 304 identifies every node or transition within the graphic, such as a shape or an arrow. The semantic model 306 may also include the type of shape used, the position of the shape, the size of the shape, etc.

In this embodiment, the format engine 302 has a determining module 304 and an assigning module 310. The determining module 304 determines what portions of the graphic are colored. For example, if the graphic is an organizational chart with three colored levels, the determining module 304 determines that the graphic has three levels. In one embodiment, the determining module 304 receives the semantic model 306. As explained above, the semantic model 306 describes the organization and layout of a graphic. For example, the semantic model 306 lists the levels within a graphic and the number of items within each level. The semantic model 306 therefore delineates the portions of the graphic. The determination module 304 parses the semantic model 306 and determines various characteristics about the semantic model 306, such as the hierarchical structure of the semantic model 306, how many elements are in the semantic model 306, etc. These characteristics may them be used by the assigning module 310 to assign color or other formats to the graphic objects created based on the semantic model 306.

The assigning module 310 also has access to the format transformation models 110. In particular, when a user selects a particular transformation, such as described about in conjunction with FIG. 1, e.g. selection 106, the assigning module 310 has access to or receives information related to that selection. Upon receiving the selection for color transformation, the format engine 302 retrieves a color transformation model 308 from a data store. The color transformation model 308 is a mathematical model and/or color scheme used for the selected color transformation on the type of graphic in the semantic model. In other words, every color transformation is calculated in a predetermined manner depending on the diagram and on the user's choice of color transformation. The assigning model 310 applies the color transformation model 308 to portions of the graphic from the semantic model 306. Thus, each portion of the graphic is automatically determined to have a certain color.

The assigning module 310 assigns the determined colors to each portion. In one embodiment, the assigning module 310 uses the portion identifications to create a color transformation definition 312. The color transformation definition 312 contains the formatting definitions for every portion identified in the semantic model 306. In embodiments of the present invention, some of the definitions include coloring definitions. Upon determining the colors for the portions of the semantic model 306, the assigning module 310 creates a color transformation definition 312 and stores it with new color definitions for the applicable portions. A color definition is a data element that provides the display with information on how to display the color of the portion of the graphic, as is explained below with reference to FIG. 8. The color transformation definition 312 is used to render a colored graphic 314 in the user's display device. The color definitions are dependent upon the color model used. However, in some embodiments, the assigning module 310 may not create a color transformation definition and simply update, as represented by the dashed arrow 318, the colored graphic 314 displayed by the display device.

In a further embodiment, the present invention may include a rendering engine 316. The rendering engine 316 renders the colored graphic 314. In one embodiment, the rendering engine 316 determines the shapes, transitions, and other elements of the color graphic 314 from the semantic model 306. Using the identification tags within the semantic model, as is explained below with reference to FIG. 8A and FIG. 8B, the rendering define 316 extracts formatting information from the color transformation definition 312. For example, the rendering engine 316 looks up the identification tag for all nodes within level three in the color transformation definition 312. The color settings for the nodes within level three may be the same. Thus, the rendering engine 316 colors every node within level three with the color provided by the setting in the color transformation definition 312.

Figure 4A:
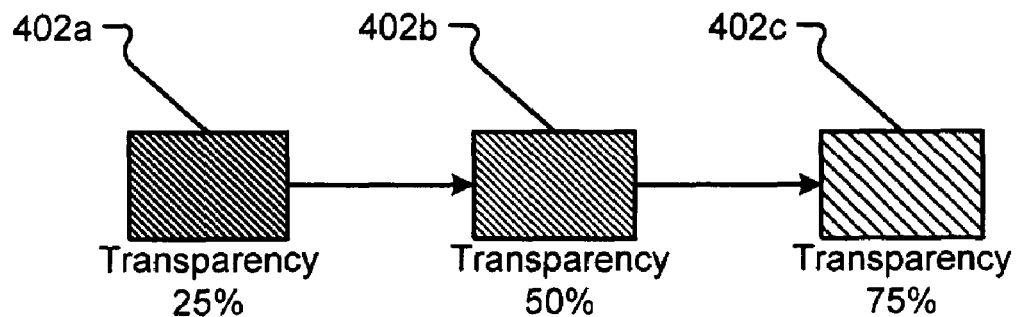
FIG. 4A, FIG. 4B, and FIG. 4C are exemplary embodiments of color transformations automatically applied to a graphic according to the present invention.
Figure 4B:
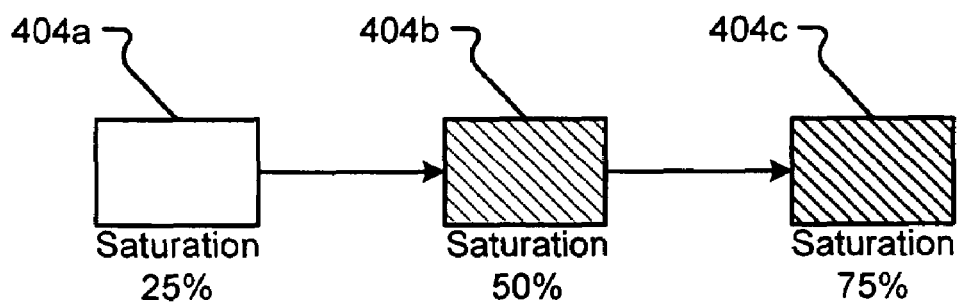
Figure 4C:
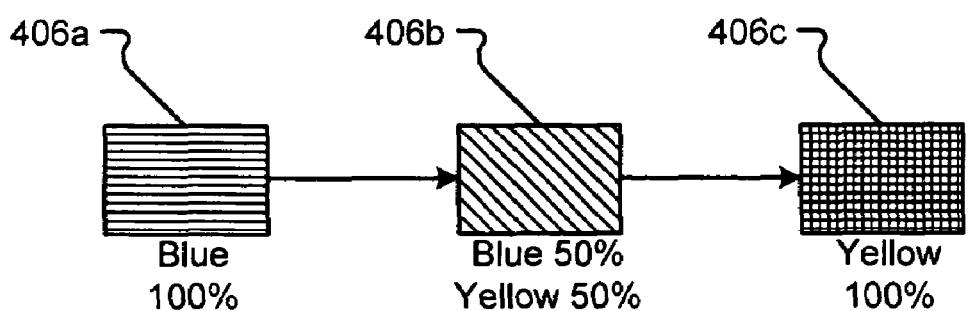

Exemplary embodiments of color transformations are shown in FIG. 4A, FIG. 4B, and FIG. 4C. In a first embodiment, a color transformation to three portions of a graphic is shown in FIG. 4A. The three portions 402a, 402b, and 402c are three nodes. Each node has a different color setting or color value. In one embodiment of the present invention, color value may include any setting for transparency, saturation, hue, or alpha channeling. The hue value, in embodiments of the present invention, is calculated in the red, green, blue color system or the cyan, magenta, yellow, black color system. One skilled in the art will recognize that the color theory or system used for the graphics is immaterial and that the present invention may be used with any color theory or system. The three nodes in the present embodiment have three transparency settings.

If a user selects a color transformation that changes the transparency of the portions of the graphic, such as selection 114 in FIG. 1, the present invention can automatically change the transparency of the portions of the graphic. The semantic model for the graphic in FIG. 4A has a single level of nodes with the level containing three nodes. If the user chose a color transformation selection that required a proportional change in transparency, the three nodes are assigned a transparency that changes equally from node to node. For example, if the first node 402a has a first transparency (25% transparent) and there are three nodes, the format engine 108 (FIG. 1) calculates a proportional change for each node in the semantic model. In this example, the first node transparency value may be fixed to ensure minimum or maximum levels of visibility, e.g., 100% transparent or opaque may not be acceptable. With three nodes and the first node being 25% transparent, each node should have a proportional change of 25%. Thus, the second or middle node 402b is 50% transparent, and third node 402c is 75% transparent. The calculations for color value are completed using a predetermined mathematical model provided in the color transformation model, which is explained in more detail below.

A next embodiment of a color transformation is shown in FIG. 4B. Here a change in luminosity value is shown. Luminosity is the brightness of a color. If a user selects a luminosity change, such as selection 116, the format engine 108 (FIG. 1) can retrieve a color transformation model for a proportional luminosity change for a simple graphic as shown in FIG. 4B. Again, the first node 404a receives a luminosity value, in this embodiment 25%. Then, the number of nodes is determined and the luminosity setting for each node is proportionally changed. For instance, the second or middle node 404b has a luminosity of 50%, and the third node 404c has a luminosity of 75%. Boundaries for the first and last nodes may be fixed, as discussed above.

Another embodiment of the present invention for automatically formatting the hue of portions of a graphic is shown in FIG. 4C if the user chooses a hue selection, such as selection 118 (FIG. 1). In this embodiment, the format engine 108 (FIG. 1) automatically changes the hue settings from one color to another color. For example, the first node 406a has a color of blue. The last node 406c has a color of yellow. To adjust the hue, the format engine 108 automatically determines a hue setting that is between the color settings of the first node 406a and the last node 406c, which is 50% blue and 50% yellow, as shown with the second or middle node 406b. The second node 406b essentially is green in color according to the color system. In this case, the user most likely selects the boundary colors, but it is not necessary. In another embodiment, the format engine 108 extrapolates a color not within any given color palette. For example, if the color palette includes the blue and yellow color of FIG. 4C, the format engine 108 may find another color along a color spectrum for a node added to the right of node 3 406c. This new color can be 50% yellow and 50% of another color, such as red. Thus, the format engine 108 extrapolates the color orange for a fourth node added to the diagram using the same mathematical model.

In some embodiments, the color transformation model, such as color transformation model 308 (FIG. 3), provides for color extrapolation using a color theory or scheme. For example, FIG. 9A, FIG. 9B, FIG. 9C, and FIG. 9D show exemplary embodiments of how a color scheme may be used to extrapolate colors. The format engine 302 (FIG. 3) can use the colors in the color palette to extrapolate new colors to use for coloring portions of the graphic. In one embodiment, a user selects a color palette when inputting the data input, such as data input 102 shown in FIG. 1. The color palette is the one or more colors that form a limited set of colors used in displaying color in the colored graphic. For example, the user's selection of a color palette may contain four colors: red, green, brown, and yellow. However, a user graphic, defined by the semantic model, may have more than four portions. Thus, the format engine may be required to extrapolate more colors from the four colors in the user's selected color palette.

Figure 10:
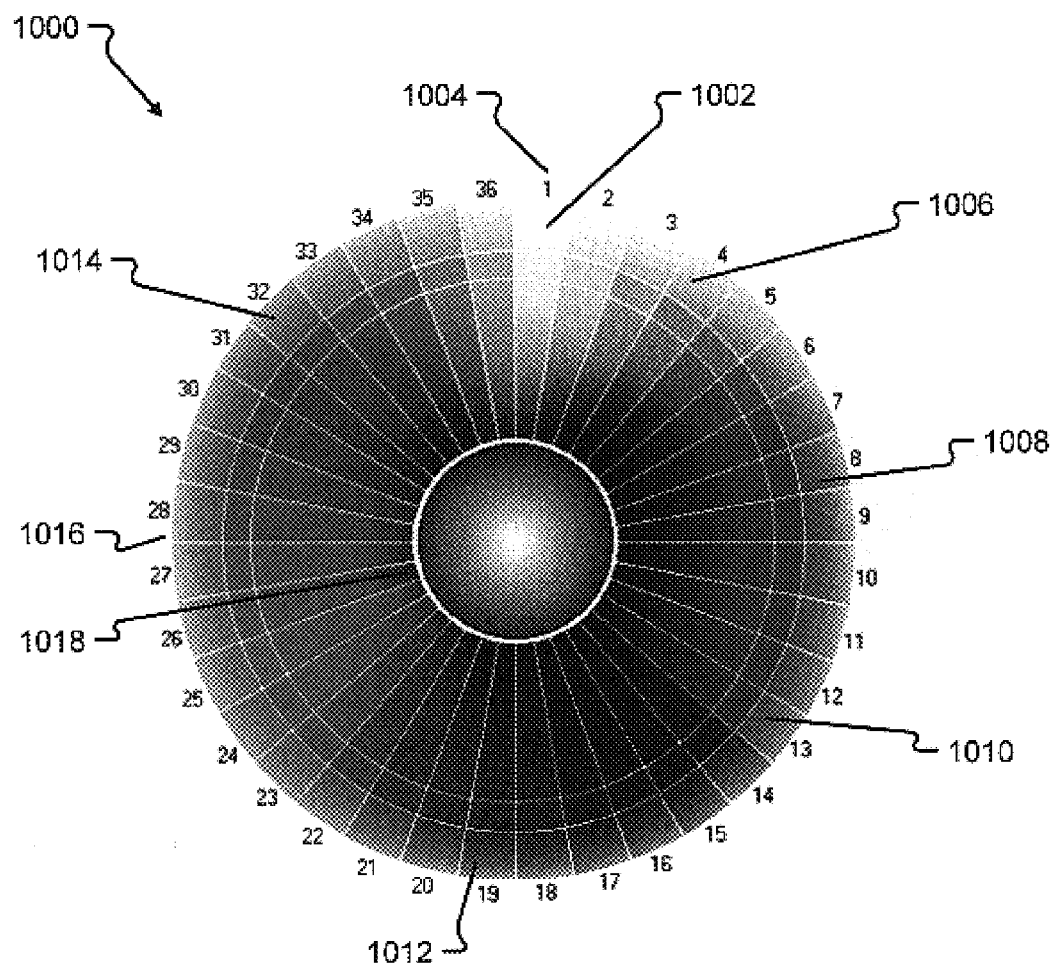
FIG. 10 is an exemplary color wheel used by the color transformation model to apply a color scheme to extrapolate colors for portions of the graphic according to the present invention.

To extrapolate the colors, the format engine applies a color scheme to a color wheel. The format engine uses a color wheel to determine colors that will function with the colors in the user's color palette. A color wheel 1000 is shown in FIG. 10. (The presented color wheel in FIG. 10 is the copyrighted material of Mr. Donald Jusko and was obtained from his website http://www.mauigateway.com/~donjusko/colorwheel.htm.) In a computer environment, a hue identification number identifies the color. For example, a computer using 32-bit color can have over 16 million colors, with each color having its own hue identification number that equates to a certain shade of color. In addition, all of the colors may be represented mathematically as a place on or within the color wheel 1000. A color wheel 1000 can represent all the colors in a prismatic spectrum. For example, in FIG. 10, the exemplary color wheel 1000 starts with the color yellow 1002, with an identification number 1004 of 1, and proceeds through the different colors along the wheel 1000, e.g., orange 1006 then red 1008 then purple 1010 then blue 1012 then green 1014, until the colors revolve around to yellow 1002 again. The exemplary embodiment of the color wheel 1000 shows 36 colors. However, some embodiments of the color wheel may represent hundreds, thousands, or millions of hues arranged according to a visual spectrum around the color wheel. As shown in FIG. 10, the color wheel 1000 may also show the effect of saturation on the tint or shade of the hue. For example, the shade of the hue increases (becomes darker) as the wheel segment goes from the exterior 1016 of the wheel 1000 to the interior 1018 of the wheel 1000.

In one embodiment, each color has a position identification number, represented in the exemplary color wheel 1000 by an integer. For example, the color yellow 1002 has the position identification number 1004 of 1. In another embodiment, a particular hue setting can be selected by the position, in degrees, minutes, and seconds, around the color wheel. For example, yellow may be at 0° while red may be at 60° and green at 300°. Thus, every color used by the computer may have two identification numbers, one for the hue setting (e.g., the 32-bit color identification) and one for the position of the color on the color wheel, stated in degrees, minutes, and seconds or the equivalent radian. The arrangement of the color wheel becomes important in using the color schemes described below.

In FIG. 9A, a monochromatic color scheme 900 is applied to a simple color wheel 902 to extrapolate new color settings. In the example, the user has selected one color, represented by the arrow 904 pointing to the segment 906 of the color wheel 902, for the color palette. The color selected is green. The format engine may extrapolate new "colors" from this single color by fixing the hue setting as green and by changing the saturation, as discussed in conjunction with FIG. 4B, by changing the transparency, as discussed in conjunction with FIG. 4A, or by changing other format settings besides hue. For example, the color transformation model mathematically determines a new shade within the segment of the color wheel by moving towards the interior of the color wheel. In this monochromatic scheme, the hue setting is fixed while other format settings change.

A complementary color scheme 908, such as that shown in FIG. 9B, can extrapolate new colors to use with the graphic. In this example, the user has selected the color green, as represented by the arrow 904 pointing to the segment 906 of the color wheel 902, as at least one of the colors in the color palette. In addition, the user has selected a color transformation model that creates or extrapolates complementary colors. The complementary scheme identifies complementary colors by selecting colors a certain number of degrees, minutes, and seconds on either side of the selected color within the color wheel. The color transformation model, in one embodiment, may select two colors, each being 60° from the selected color. For example, the color transformation model may select the color blue, represented by the arrow 912 pointing to the segment 910 of the color wheel 902. The color segment 910 is approximately 60°, as represented by the angle 920 between arrow 904 and arrow 912, to one side of segment 906, as calculated by the color transformation model. Similarly, the color transformation model may also select the color yellow, represented by the arrow 914 pointing at segment 916, as the second complementary color 60° from the color segment 906. As one skilled in the art will recognize, the color transformation model may use any angle to select the complementary colors, e.g., 10°, 20°5'11.2", or 30.869545°. In addition, the color transformation model may select several sets of complementary colors by selecting colors at certain intervals from the selected color, i.e., two colors 10° from the selected color and two more colors another 10° from the first two colors or 20° from the selected color. Thus, the color transformation model can use the complementary color scheme to extrapolate numerous new colors for all the portions in the semantic model by applying the angle in intervals.

An alternate color scheme 922 is shown in FIG. 9C. In the alternate color scheme, the color transformation model selects colors that are visually opposite to the color from the color palette. For example, the color transformation model selects the color red, represented by the arrow 926 pointing at segment 924 of the color wheel 902. Red is "visually opposite" to the color green, represented by the arrow 904 pointing to segment 906. The color transformation model selects the alternate or opposite color by choosing the color at an angle 928 that is 180° from the color in the color palette. As one skilled in the art will recognize, there is only one alternate color for every color selected in the color palette.

A split complementary scheme is shown in FIG. 9D. In this color scheme, the color transformation model identifies new colors by finding the complementary colors for both the selected color from the color palette and the complementary colors for the alternate or opposite color. The split complementary scheme identifies the complementary colors by the same methods or processes as the complementary color scheme 908 explained with FIG. 9B. The difference is that the split complementary color scheme also identifies complementary colors for the alternate color. Thus, in the exemplary split complementary color scheme 930, the color transformation model identifies the color purple, represented by the arrow 934 pointing at segment 932 of the color wheel 902, and identifies the color orange, represented by the arrow 936 pointing at segment 938 as the complementary color for the alternate color red, represented by the arrow 926 pointing at the segment 924. One skilled in the art will recognize how the color transformation model identifies colors by calculating the angles from the segment of the color wheel representing the color from the color palette. In addition, one skilled in the art will also recognize that the present invention may employ other color schemes, e.g., triadic, tetrad, etc., to extrapolate new colors for portions of the graphic represented by portions of the semantic model.

Figure 5:
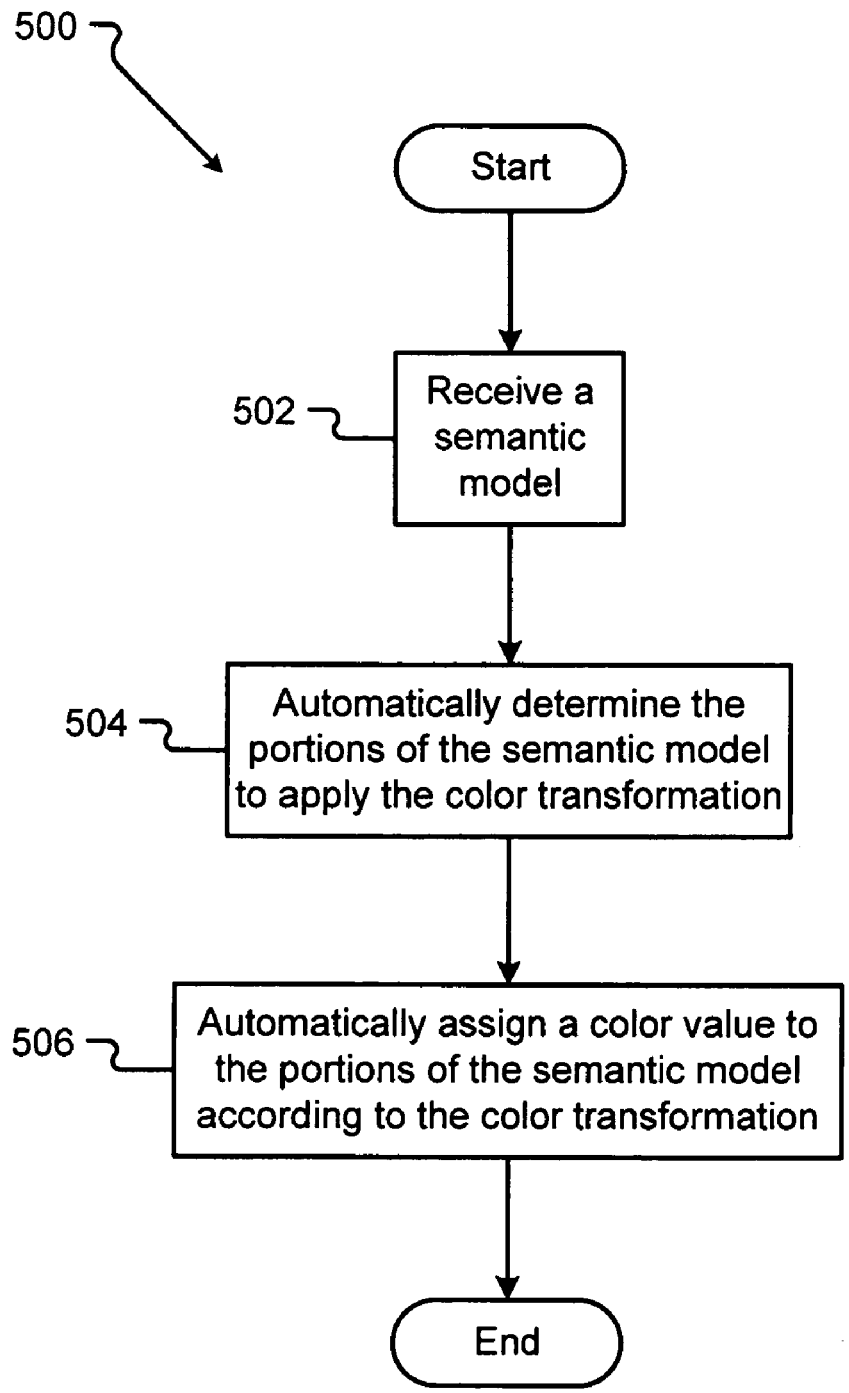
FIG. 5 is a flow diagram representing an embodiment of the present invention for formatting graphical content according to the present invention.

An embodiment of a method 500 for automatically coloring a graphic is shown in FIG. 5. Receive operation 502 receives a semantic model, such as semantic model 104 (FIG. 1). In one embodiment, a format engine, such as format engine 108 (FIG. 1), receives the semantic model. The semantic model provides information about the type of graphic, the number and types of portions or elements within the graphic, and other information about the configuration and layout of the graphic.

Determine operation 504 determines the portions of the semantic model to apply the formatting and what types of formatting. In general, determine operation 504 parses the semantic model, evaluating the components for hierarchical evidence and other characteristics that might be relevant to variants in formatting. For instance, determine operation 504 may determine how many objects are in the semantic model. Determine operation 504 may determine how many levels and/or sublevels exist between the objects. Determine operation 504 may do this evaluation with or without information related to a selection of a format transformation model. That is, in one embodiment, if the format transformation relates to color and one solid color is selected regardless of the semantic model contents, then determine operation 504 need not and does not spend time evaluating the semantic model. In another embodiment, determine operation 504 performs the analysis independent of the transformation such that when the transformation changes, no new analysis need be done on an existing semantic model.

In other embodiments, determine operation 504 automatically determines the portions of the semantic model to apply a color transformation or other format transformations. In one embodiment, a user selects a color transformation, such as selection 106 (FIG. 1). The selected color transformation model is retrieved from a data store. A color transformation definition is created that describes to what and how to apply the selected color transformation. Using the description of the color transformation in the color transformation model and the semantic model, the formation engine determines the number of portions to assign a color value according to the color transformation model.

Upon determining the characteristics of the semantic model, assign operation 506 automatically assigns the color values to the portions of the semantic model. In one embodiment, the format engine applies a mathematical model from a selected color transformation model to the number of portions determined by the determine operation 504 and the results are displayed. For example, the user may have chosen a color scheme having two colors, blue and yellow. However, the semantic model may have three portions. The color transformation model may use a proportional math model to extrapolate a new color with a hue value between the blue and yellow hue, such as green, to apply to the third portion. In another embodiment, the format engine modifies the color transformation definition, such as color transformation definition 312 (FIG. 3) that holds the characteristic information about the graphic and the color transformation definition is used to render the displayed graphic. In this case, the color transformation definition 312 provides the color settings for the displayed graphic 314.

Figure 6:
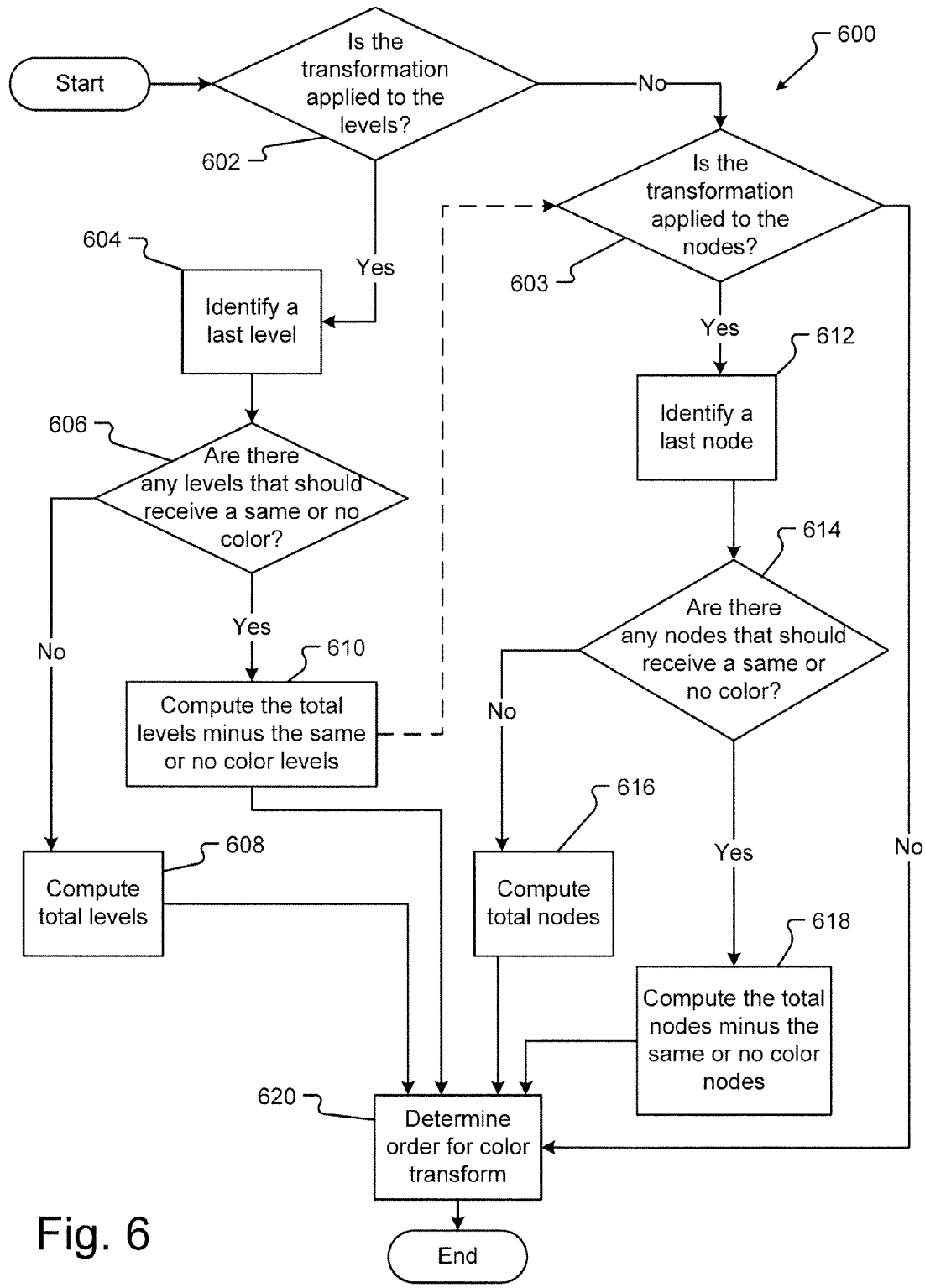
FIG. 6 is a flow diagram of a further embodiment of the present invention for determining one or more portions of a graphic to which to assign color.

A further embodiment of a method 600 for determining the color values for the graphic is shown in FIG. 6. The process 600 relates to an embodiment of determine operation 504 in FIG. 5. Initially, determine operation 602 determines if the color transformation will be applied to levels within the graphic. In one embodiment, the color transformation model describes whether the format engine, such as format engine 108 (FIG. 1), assigns colors by the level or the node. A level is a structure within a graphic that can contain one or more elements, such as levels 120a, 120b, 120c, and 120d (FIG. 1). If the color transformation is applied to the level, identify operation 604 identifies the last level in the graphic. In one embodiment, the format engine searches a semantic model, such as semantic model 104 (FIG. 1), for an element in a last level. For instance, if all elements have a label identifying the level the element is in, then the format engine finds the elements with the lowest level identified in their respective labels, i.e., the lowest elements. In an exemplary embodiment, each element has an identify label, such as "normal 1," "normal 2," etc., as shown in semantic model 104 (FIG. 1). The lowest level, in this example, is "normal 3." Thus, the format engine recognizes that there are three levels in the graphic according to the semantic model.

Following identify operation 604, determine operation 606 determines if any elements or levels receive a same color or no color. For example, in the exemplary semantic model 104 in FIG. 1, item "E" and item "H" receive a same color because the semantic model identifies the label, "normal3," for both the nodes. Thus, node "H" should not be understood to be a separate level receiving a different color. If there is a level that should not receive a different color value, flow branches Yes to compute operation 610, which computes the number of levels by subtracting the number of levels not receiving a separate color value from all the levels. If all levels receive a separate color value, flow branches No from operation 606 to compute operation 608, which computes the total number of levels.

Next, determine operation 620 determines the order in which the color transformation is applied. In one embodiment, a first level listed in the semantic model, like level "1," is the first level in the order. Likewise, the last level listed in the semantic model is the last portion in the order. Thus, the formation engine orders all levels by the order listed in the semantic model. In other embodiments, the semantic model has an order ID or other data element designating the order. In still another embodiment, the color transformation model expresses how the order is determined.

A similar process occurs if the color transformation is applied to the nodes. That is, if determine operation 602 determines that the transformation should not apply to the levels, then flow branches No to determine operation 603. In addition, if the color transformation applies to the levels and the nodes, optional flow branches from computer operation 610, or computer operation 608 (flow branch not shown), to determine operation 603. Determine operation 603 determines if the transformation is to be applied to the nodes. A node is an element within a graphic that can be a shape, a transition, such as an arrow or line between shapes, or other item, such as nodes 402a, 402b, and 402c. If the color transformation is not to be applied to the nodes, flow branches No to determine operation 620 described below to color other graphical elements. If the color transformation is to be applied to the nodes, flow branches Yes to identify operation 612, which identifies the last node in the level. In one embodiment, the format engine counts the number of elements or nodes that have the same level label. For example, in semantic model 104 in FIG. 1, there are five nodes that have the level label "normal 3." Thus, the system may interpret the semantic model as having five nodes in the third level. However, upon identifying the nodes, determine operation 614 determines if any of the nodes within the graphic receive no or the same color value. For example, the structure of the semantic model 104 shows that node "H" is subordinate to node "E." Node "H" also has the same level label. In one embodiment, having a subordinate node with the same level label signifies that the node should receive the same color. Thus, node "H" should not be considered in the color transformation calculations. If determine operation 614 determines that all nodes should be considered, flow branches No to compute operation 616, which computes the total number of nodes in the level if all nodes are considered in the color transformation. On the other hand, if one or more nodes are not considered as determined by operation 614, e.g., node "H," then flow branches Yes to compute operation 618, which computes the number of nodes by subtracting the nodes not considered for a different color value from the total number of nodes.

Next, determine operation 620 determines the order in which the color transformation is applied. In one embodiment, a first node listed in the semantic model, like node "A," is the first node in the order. Likewise, the last node listed in the semantic model is the last portion in the order. Thus, the formation engine orders all nodes by the order listed in the semantic model. In other embodiments, the semantic model has an order ID or other data element designating the order. In still another embodiment, the color transformation model expresses how the order is determined.

Figure 7:
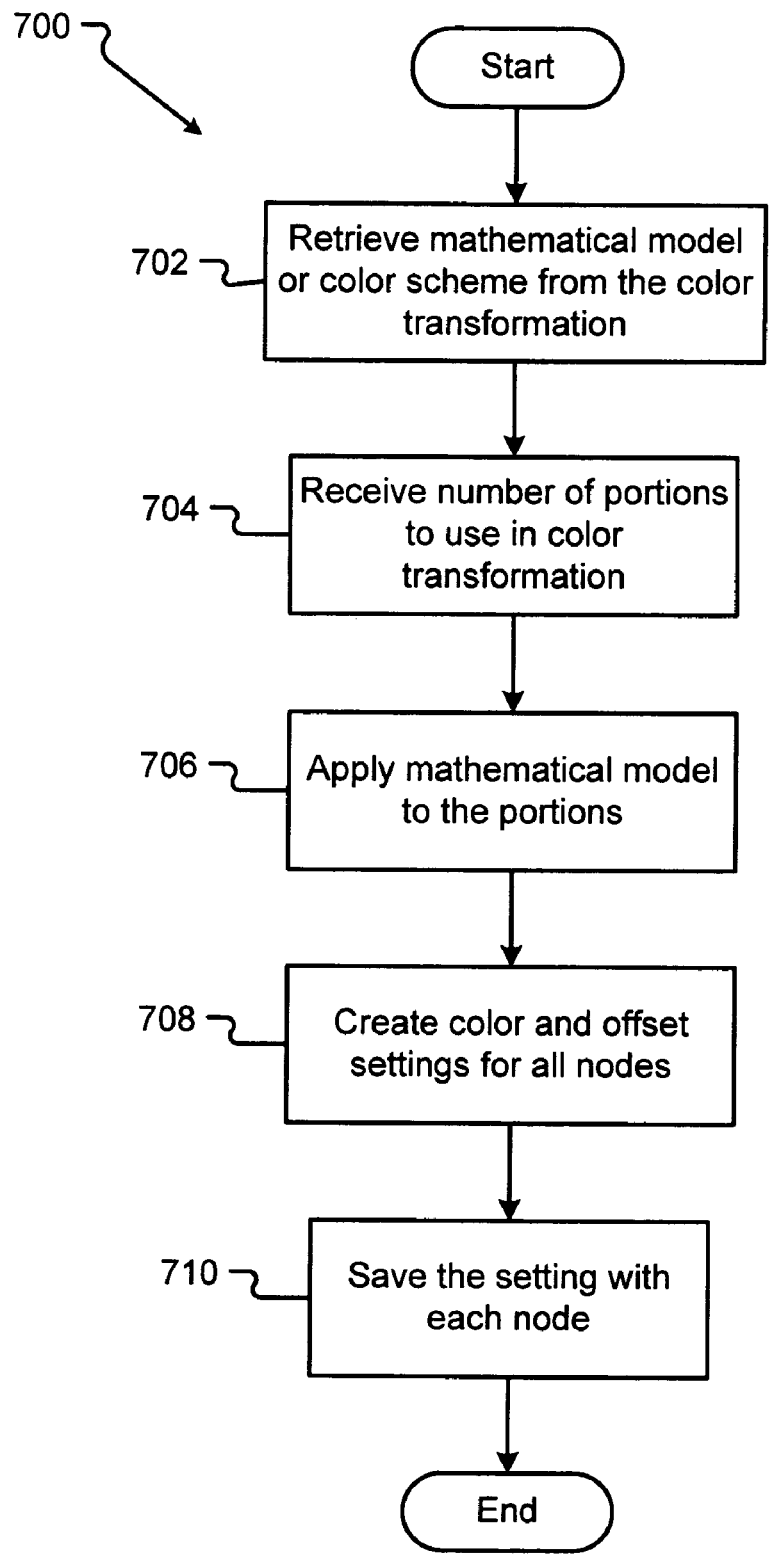
FIG. 7 is a flow diagram representing a further embodiment of the present invention for assigning color to a portion of the graphical content.

A further embodiment of a method 700 for assigning color values to portions of a graphic is shown in FIG. 7. Retrieve operation 702 retrieves the mathematical model or color scheme for the selected color transformation. In one embodiment, a format engine, such as format engine 108 (FIG. 1), retrieves a color transformation model from a data store, such as color transformation model 312 (FIG. 3). Within the color transformation model, a mathematical model or color scheme is expressed for computing the color values for the determined portions of the semantic model. In one embodiment, colors are calculated using the color scheme, as discussed in conjunction with FIG. 9A, FIG. 9B, FIG. 9C, and FIG. 9D. In one embodiment, the mathematical model provides a method for calculating a proportional change in the color value, as explained above with reference to FIG. 4A, FIG. 4B, and FIG. 4C. The mathematical model for the proportional change may be a simple slope calculation. For example, the proportional change in color is calculated as the change in color value over the number of portions in the graphic.

Other mathematical models are used in other embodiments. For example, an exponential model may double the change for each node. Thus, a first node has 5% transparency, a second node has 10%, a third node has 20%, and so on. In another embodiment, the mathematical model alternates or varies the color of each portion. Thus, every other portion receives a same color value. For example, nodes 1, 3, 5, and 7 receive a transparency of 25% while nodes 2, 4, 6, and 8 receive a transparency of 75%. Other mathematical models are possible and contemplated as one skilled in the art will recognize.

Upon retrieving the mathematical model, receive operation 704 receives the number of portions for the graphic and/or other characteristics, such as may be determined by determine operation 504 discussed above with respect to FIG. 5. In one embodiment, the number of nodes is received. In another embodiment, the number of levels is received. Next, apply operation 706 applies the mathematical model or color scheme, described above, to the number of portions. The application of the mathematical model or color scheme changes according to the number of portions. For example, if a proportional model is used and there are 11 nodes, the setting for transparency starts at 0%, ends at 100%, and increments every 10%. In contrast, if there are only six nodes, the transparency settings start at 0%, end at 100%, but increment every 20%. One skilled in the art will recognize how the application of the mathematical model or color scheme adjusts for the type of graphic and number of portions in the graphic. As may also be well understood, the boundary values may be fixed at some values greater than 0% and less than 100% in some embodiments.

Next, create operation 708 creates color and offset settings for each portion of the graphic. In an embodiment of the present invention, a user employs a color palette. For example, in some presentation programs, a color palette is provided that provides a set of colors to use within the presentation that are arranged in a predetermined set. The present invention, in one embodiment, determines color settings from the color palette. Thus, if the user selects a hue change, the format engine takes a first color from the color palette and assigns that color to a first portion of the graphic. The format engine then assigns a complementary color using a color scheme, such as color scheme 908 described in conjunction with FIG. 9B, to the last portion of the graphic. The format engine assigns offsets between the first hue setting and the last hue setting to each portion between the first and last portion. Offset values decrease the amount of the first hue and increase the amount of the last hue in each subsequent portion of the graphic. In another embodiment, a first portion has a first hue setting, a middle portion has a second hue setting, and a last portion has a third hue setting. The format engine creates offsets for hue between the first and second hue settings and between the second and third hue settings. In another embodiment, the format engine selects complementary colors with a complementary color scheme, such as color scheme 908 (FIG. 9B), for the second hue.

Save operation 710 then saves the color and offset settings for each portion. In one embodiment, the format engine retrieves or creates a color transformation definition, such as color transformation definition 312 shown in FIG. 3, and sets the color values for the portions of the graphic. In other embodiments, the format engine saves the color settings with the semantic model. The color transformation definition 312 or semantic models are then used to render the drawing, as discussed in FIG. 3.

An embodiment of an exemplary semantic model 800 is shown in FIG. 8A, and an exemplary embodiment of a related color transformation definition 810 is shown in FIG. 8B. The exemplary semantic model 800, also called a diagram definition, will help describe the color transformation definition 810. The semantic model 800 has one or more tags 802 specifying a graphic element within the graphic. In one embodiment, the tag 802 defines the type of element. For example, the tag 802 states "LayoutNode." Other types of elements may include transitions, background elements, or adornments. A more detailed description of the diagram definition or semantic model is provided in related application Ser. No. 10/955,271, entitled "METHOD, SYSTEM, AND COMPUTER-READABLE MEDIUM FOR CREATING AND LAYING OUT A GRAPHIC WITHIN AN APPLICATION PROGRAM," filed on Sep. 30, 2004 and assigned to Microsoft Corporation, which is incorporated herein in its entirety. The table that follows has exemplary definitions for some of the possible element types:

| Style Label | Description |
| --- | --- |
| Normaln | Any node at level n. For example, all nodes in a chevron diagram would be labeled Normal1, Normal2, . . ., Normaln |
| Transitionn | Any transition that stretches from Normaln. |
| Background | Background shape of the diagram |
| Adornment | Any adornment for the diagram that may exist |

A style label 804 defines the element further. In the exemplary embodiment, the style label 804 has a reference for the element: "normal1." In one embodiment, the style label 804 identifies the elements or shapes at each level. Thus, the reference, in one embodiment, refers to the level upon which the element occupies. In another embodiment, the reference refers to the element number within the level, e.g. element 1, element 2, etc. For the exemplary embodiment, the style label 804 designates the level within the graphic for the element. In some embodiments, each level is indented within the semantic model. Thus, every shape in the same level has the same indentation. The format engine discerns the number of elements in a level by counting the number of tags 802 having the same indentation. That said however, other, non-indenting methods may be used, such as through nesting.

A next tag 806 identifies a next element. The tag 806 has a different indentation than the first element tag 802. Thus, the next tag 806 designates that the next element is on a different level, and, with the indentation being greater than the first tag 802, the next tag 806 designates that the next element is a child or subordinate element to the first element. The next element also has a style label 808 that has a new reference, "normal2," used for all elements on the next level.

As may be appreciated, indention may be removed, but nesting still implies a next element.

A color transformation definition 810 uses the information within the semantic model 800 to create automatic color transformations for the graphic. The color transformation definition 810 may have one or more of the following items of information: an identification 812, a name 814, a category 816, a diagram category 818, one or more style labels 820 and 826, format identifications 822, 830, and 832, and format settings 824 and 828. The name, also called the strongname, and the category help define the type of color transformation, the color transformation model that will be used for the color transformation definition, and the user interface information for the color transformation selection in the user interface. The table that follows describes each of the exemplary items of information that may be present within the color transformation definition:

| Sample XML | Description |
| --- | --- |
| <ColorTransform> | Identification of the color transformation |
| <Name>Complimentary</name> | Name of the color transformation |
| <StrongName Name="comp 1"/> | Name or strongname is used for sorting |
| <Priority Value="10000"/> | Priority is used for display order in the user interface |
| <Categories> <Category Name="Colorful" Priority=10000/>... </Categories> | Maps to a category in a color transformation categorization file. |
| <DiagramCategory value="Hierarchy"/> | Specifies which diagram category a color transform is specific to |
| <StyleLabel Name="Node 1"> | Specifies which style label the following transformation details apply to |
| <FillColor> | Specifies the base color from the color buckets in a color scheme to apply to all nodes that are tagged with the StyleLabel |
| <BaseColor Base="1" Hue\|Sat\|Lum\|Trans="%20"/> | Specifies the offset for Hue, saturation, luminosity, and/or transparency from the color bucket |
| <LastColor Base="1" Hue\|Sat\|Lum\|alpha="20%" cycle="true"/> | Lastcolor specifies the last color in a set of shapes at the same level. If this is specified, layout interpolates the hue, saturation, luminosity, and transparency between the first and last shape. Roundtrip indicates whether or not to interpolate all the way to the last shape. If "cycle" is set to yes, interpolation occurs between the first shape and a middle shape, and then to the last shape so that the last shape and the first shape have the same color. |
| <StrokeColor/> | The same can be specified for the stroke color |
| <TextColor/> | The same can be specified for the text color |
| </StyleLabel> | After the first StyleLabel, the color transformation could specify more behaviors for more style labels. |

The exemplary color transformation definition 810, of FIG. 8B, is retrieved or created when the user selects to proportionally change the luminosity for the fill colors of the elements within the various levels of a hierarchy diagram. The diagram category designation 818 is "Hierarchy." In other embodiments, the diagram category designation 818 would be different depending on the type of diagram created by the user. Thus, the diagram category may also be "process," "static diagram," etc. The first style label 820 retrieved from the semantic model is for all elements within a first level having a reference of "normal1." Another style label 826 has a reference to elements in a third level labeled "normal3." There may be more style labels than those currently shown in the color transformation definition 810.

The format tag 822 designates the visual characteristic changed for the elements with the reference in the style label 820. In the present embodiment, format tag 822 designates that the fill color is changed. Other format tags are possible including tags for text color 830 and line color 832. A color setting 824 is provided under the format tag 822. The color setting 824 provides a base color. For example, "index='3'" sets the base color to a value of 3. Then each level has an offset setting measured from the base color. In the present embodiment, the setting is for luminosity. The color transformation definition 810 specifies offsets for hue, saturation, alpha channeling, and other settings in other embodiments. The user's selection of a color transformation designates what the color transformation definition setting will be applied. The offset is expressed as a percentage from the base color. For example, the offset in color setting 824 is 20%. In other embodiments, the offset is expressed as an integer value, such as from 1 to 10, or in degrees, such as 0° or 360°. A color setting 828 for a third style label 826 has a luminosity offset of 60%. Thus, elements within a third level with a reference of "normal3" will be rendered as 40% more luminous than elements within the first level with a reference of "normal1."

The mathematical model or color scheme applied in the color transformation definition is associated with the color transformation selection chosen by the user. Thus, if the user chooses a proportional luminosity change over the levels of the diagram, the format engine will build the color transformation definition according to a simple slope calculation for the levels specified within the semantic model. The mathematical model or color scheme is not expressed in the color transformation definition but is applied and can be understood by the results saved within the color transformation definition.

In embodiments of the present invention, a color transformation definition 312 stores the color settings as part of the color transformation definition 312. In other embodiments, the color transformation definition 312 builds references to the color transformation definition. Regardless, when applying color during the rendering of the displayed graphic, the color transformation definition is referenced for color settings for each style label. The style labels for the elements are found within the color transformation definition. The color values and offsets associated with the style labels are then used to create the colors for each element. Therefore, the color transformation definition automatically provides the colors for the rendered graphic, as explained above with reference to FIG. 3.

Although the present invention has been described in language specific to structural features, methodological acts, and computer-readable media containing such acts, it is to be understood that the present invention defined in the appended claims is not necessarily limited to the specific structure, acts, or media described. One skilled in the art will recognize other embodiments or improvements that are within the scope and spirit of the present invention. Therefore, the specific structure, acts, or media are disclosed as exemplary embodiments of implementing the claimed invention. The invention is defined by the appended claims.

What is claimed is:

1. A computer-readable media, embodied in at least one tangible media, having a method executable by a computer system for applying a color transformation to a graphic, performing steps comprising:
   receiving a semantic model for the graphic;
   receiving a color transformation selection for the graphic;
   automatically determining one or more portions of the semantic model;
   automatically determining whether the one or more portions should receive the same color or no color;
   based upon the determinations, automatically determining color values according to a color transformation model; and
   automatically applying the color values to the one or more portions of the semantic model.

2. A computer-readable medium of claim 1, wherein the color transformation model is a mathematical model for assigning the color values.

3. A computer-readable medium of claim 2, wherein the mathematical model comprises a proportional model, an exponential model, an alternating model.

4. A computer-readable medium of claim 2, wherein the color transformation model automatically assigns the color value for the one or more portions of the semantic model by extrapolating from a base color using the mathematical model.

5. A computer-readable medium of claim 1, wherein the color transformation model assigns the color values for one or more portions of the semantic model by extrapolating a new color from a base color using a color scheme.

6. A computer-readable medium of claim 1, wherein the color values assigned comprise hue, luminosity, saturation, alpha channeling.

7. A computer-readable medium of claim 1, wherein the color transformation creates a color transformation definition, wherein the color transformation definition establishes a base color and an offset for the color for the one or more portions of the graphic.

8. A computer-readable medium of claim 1, further comprising:
   receiving a next semantic model; and
   automatically reassigning the color values according to the color transformation for the one or more portions of the next semantic model.

9. A computer-readable medium of claim 1, further comprising:
   receiving a selected hue in a color palette;
   extrapolating one or more new colors by applying a color scheme to a color wheel; and
   automatically assigning the one or more new colors to one or more portions of the graphic created by the semantic model, comprising setting a color property of a graphic object to a new color.

10. A computer-readable medium of claim 9, wherein the color scheme is one of a monochromatic scheme, a complementary scheme, an alternate scheme, a split complementary scheme.

11. A computer-readable medium of claim 9, wherein the color transformation models extrapolates the new colors by determining a new color that is a predetermined distance in the color wheel from the selected hue.

12. In a computer system having a graphical user interface including a display device and one or more user interface selection devices, a method for automatically creating a colored graphic, comprising:
   receiving a semantic model for the graphic;
   receiving a color transformation selection for the graphic;
   automatically determining one or more portions of the semantic model;
   automatically determining whether the one or more portions should receive the same color or no color; and
   based upon the determinations, displaying a rendered graphic with automatically assigned color values for the graphic that relate to one or more portions of the semantic model.

13. A method of claim 12, wherein the color transformation applies a color scheme to the graphic.

14. A method of claim 12, wherein receiving a color transformation further comprises:
   receiving a selection of color model; and
   displaying a rendered graphic wherein the assigned color values apply at least one color determined from the color model.

15. A computer-readable medium having stored thereon a data structure, comprising:
   a first data field containing data specifying one or more portions of a semantic model that receives a color transformation; and
   a second data field functioning to determine whether the one or more portions should receive the same color or no color and, based upon the determination, to assign a color value to the one or more portions of the semantic model in the first data field according to the color transformation model.

16. A computer-readable medium of claim 15, wherein the second data field specifies a base color value from which to determine color values with the color transformation model.

17. A computer-readable medium of claim 15, further comprising a third data field identifying the graphic category, which specifies the type of graphic represented by the semantic model.

18. A computer-readable medium of claim 17, further comprising a fourth data field naming the type of color transformation.

19. A computer-readable medium of claim 18, wherein the fourth data field provides information for a color transformation selection in a user interface.

20. A computer-readable medium of claim 18, wherein the fourth data field identifies the color model used in the second data field.

* * * * *